United States Patent [19]

Shakeri

[11] Patent Number: 5,054,506

[45] Date of Patent: Oct. 8, 1991

[54] ROCK AND GRAVEL CLEANER

[76] Inventor: Shahrokh Shakeri, P.O. Box 3211, Wichita Falls, Tex. 76309

[21] Appl. No.: 578,453

[22] Filed: Sep. 7, 1990

[51] Int. Cl.$^5$ .............................................. B08B 3/02
[52] U.S. Cl. ................................... 134/105; 134/111; 134/132; 134/104.4; 210/522
[58] Field of Search ................ 134/111, 65, 132, 134, 134/140, 104.4, 109, 105, ; 210/522, 513, 515, 922

[56] References Cited

U.S. PATENT DOCUMENTS

| | | | |
|---|---|---|---|
| 2,090,191 | 8/1937 | Edhoffer | 134/132 |
| 2,135,165 | 11/1938 | Bucher et al. | 134/132 |
| 2,909,872 | 10/1959 | Kearney et al. | 134/132 |
| 3,085,948 | 4/1963 | Kearney et al. | 134/111 Y |
| 3,498,839 | 3/1970 | Mehta | 134/132 |
| 4,651,762 | 3/1987 | Bowden | 134/111 |
| 4,719,933 | 1/1988 | Jackson | 134/132 X |

Primary Examiner—Frankie L. Stinson
Attorney, Agent, or Firm—Michael I. Kroll

[57] ABSTRACT

A rock and gravel cleaner is disclosed. The rock and gravel cleaner includes a tank having a frame, a water heater connected to the tank, a motor containing an idler pulley arrangement and a fan belt, and a revolving cylinder having a reel at each end revolves via the energy transported from the motor to the reel by the fan belt so that the cylinder revolves on the frame.

4 Claims, 2 Drawing Sheets

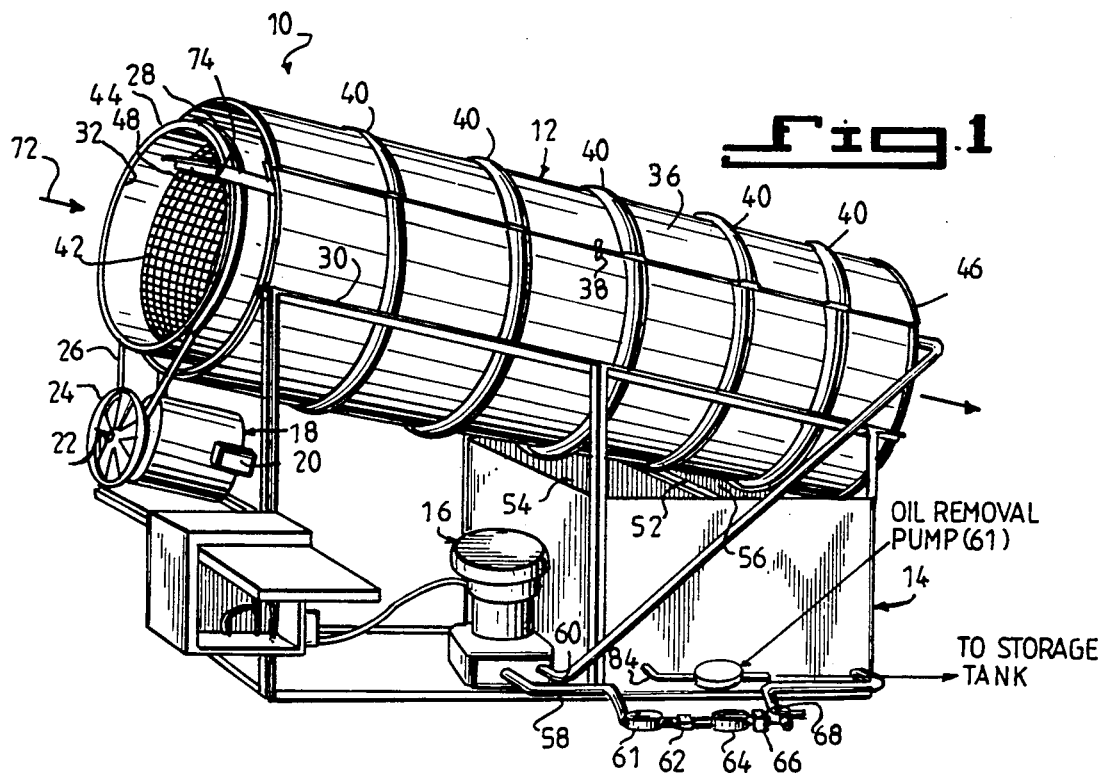
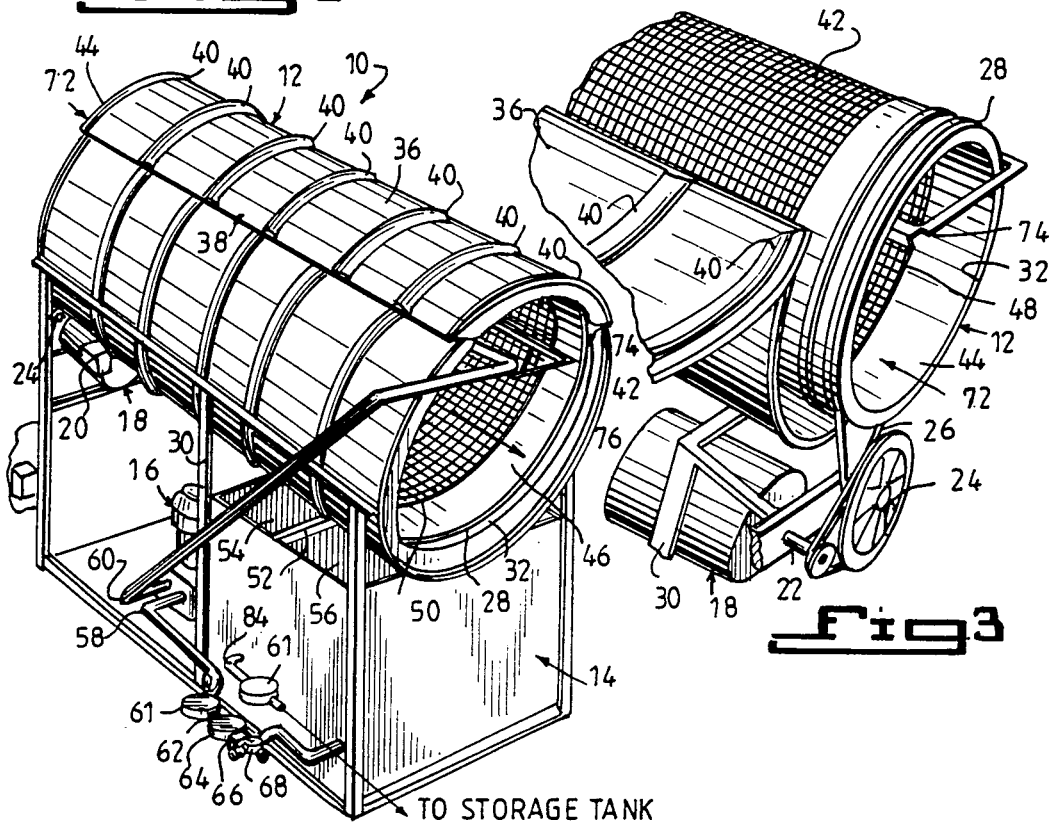

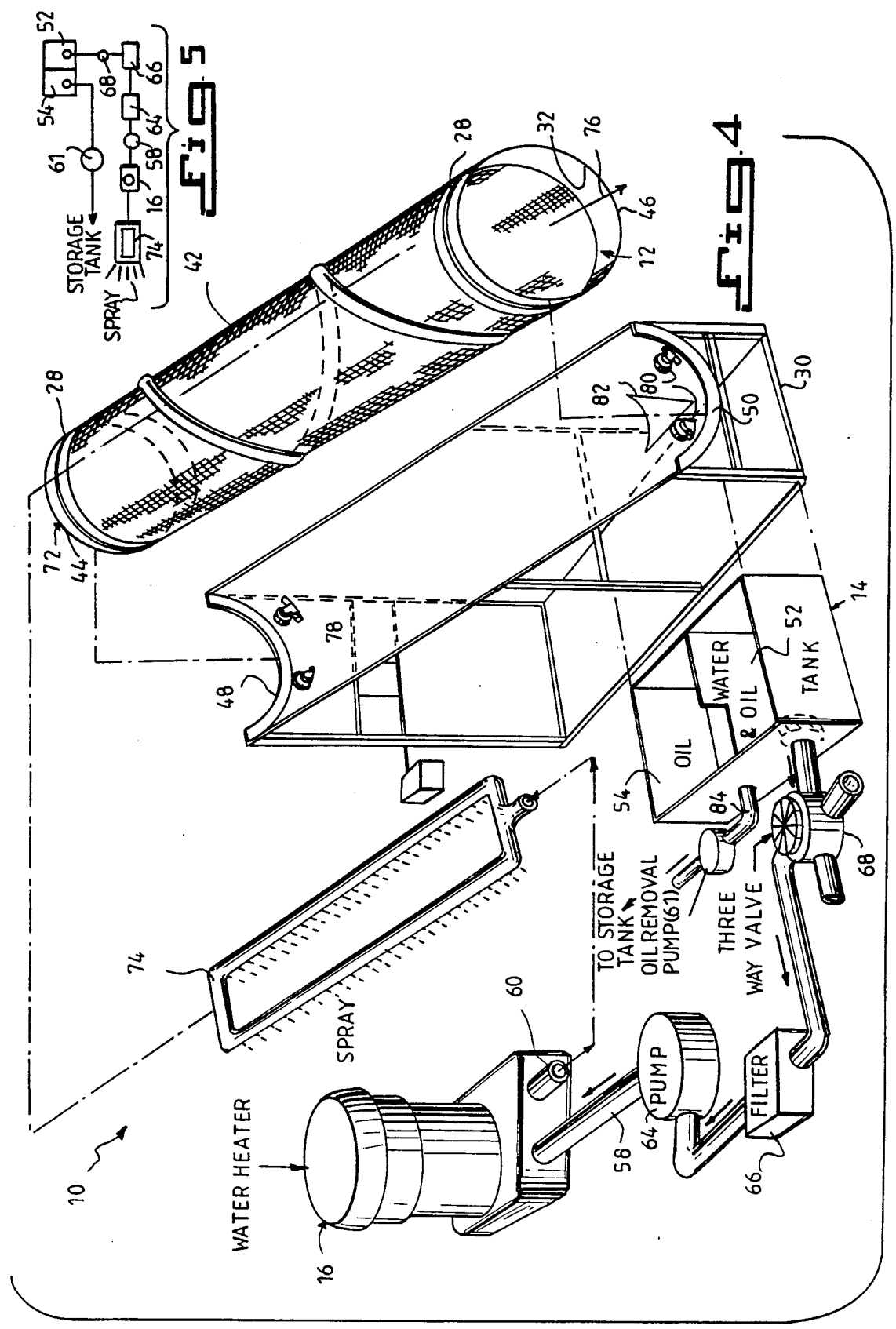

ROCK AND GRAVEL CLEANER

BACKGROUND OF THE INVENTION

1. Field of the Invention

The present invention relates to rocks and gravel.

More particularly, the present invention relates to a rock and gravel cleaner.

2. Description of the Prior Art

Numerous innovations for rock and gravel cleaners have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a rock and gravel cleaner that avoids the disadvantages of the prior art.

More particularly, it is an object of the present invention to provide the rock and gravel cleaner of the present invention washes the polluted rocks and gravel using a high pressure, preheated spray. The polluted particles are thrown into the cylinder, manually. The polluted particles are sprayed with hot water for 15 or 20 seconds, and discharged from tho other end of the cylinder. As the mixture of water and oil, which was washed off of the rocks during the primary operation into a tank for separation and recycling.

The rock and gravel cleaner of the present invention saves time, labor, and money. It cleans deeply and recycles the chemicals used.

In keeping with these objects, and with others which will become apparent hereinafter, one feature of the present invention resides, briefly stated, in a rock and gravel cleaner, comprising, a tank having a frame, a water heater connected to the tank, a motor containing an idler pulley arrangement and a fan belt, and a revolving cylinder having a reel at each end revolves via the energy transported from the motor to the reel by the fan belt.

When the rock and gravel cleaner is designed in accordance with the present invention, the cylinder revolves on the frame.

In accordance with another feature of the present invention, is that it further comprises a shell door contained in the cylinder.

Another feature of the present invention is that it further comprises rips imposed with the cylinder for added strength and definition.

Yet another feature of the present invention is that it further comprises a spiral screen disposed beneath the cylinder, the cylinder having a pair of end caps for aiding in the holding of the spiral screen in place.

Still another feature of the present invention is that the tank contains a partition that separates the tank into a first part for oil and a second part for oil and water.

Yet still another feature of the present invention is that the water heater includes an input pipe and an output pipe, the output pipe includes a pressure switch, a pump, a filter, a three way valve, and a primary filter. The oil removal pump instead of being located in the same line as the water heater, is located on a separate pipe of oil tank part.

Still yet another feature of the present invention is that the primary filter is disposed internally to the tank where the outpipe enters the tank.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a perspective view of the rock and gravel cleaner of the present invention;

FIG. 2 is a perspective view of the rock and gravel cleaner of the present invention showing the details of the exit portion;

FIG. 3 is a partial perspective view of the rock and gravel cleaner of the present invention showing the details of the enter portion;

FIG. 4 is an exploded perspective view of the rock and gravel cleaner of the present invention; and FIG. 5 is a schematic of the rock and gravel cleaner of the present invention.

LIST OF REFERENCE NUMERALS UTILIZED IN THE DRAWING

10—rock and gravel cleaner of the present invention
12—cylinder of the rock and gravel cleaner 10 of the present invention
14—tank of the rock and gravel cleaner 10 of the present invention
16—water heater of the rock and gravel cleaner 10 of the present invention
18—motor of the cylinder 12
20—regulator internal to the motor 18
22—shaft of the motor 18
24—idler pulley arrangement
26—belt for the pulley 24
28—reel on the cylinder 12
30—frame on which the cylinder 12 revolves
32—substantially hollow compartment of the cylinder 12
36—shell door of the cylinder 12
38—locking means for the shell door 36
40—ribs of the cylinder 12
42—spiral screen of the cylinder 12
44—first end of the cylinder 12
46—second end of the cylinder 12
48—first end cap of the first end 44
50—second end cap of the second end 46
52—partition in the tank 14
54—one part of the tank 14
56—another part of the tank 14
58—input pipe of the water heater 16
60—output pipe of the water heater 16
61—oil removal pump
62—pressure switch on the output pipe 60
64—pump on the output pipe 60
66—filter on the output pipe 60
68—three way valve coming from the tank
70—primary filter disposed within tank 14
72—polluted rock and gravel
74—spray
76—clean rock and gravel
78—upper pair of ball bearings
80—lower pair of ball bearings 82—a triangular void at the end 46 of the cylinder 12
84—an oil removal pump line

DETAILED DESCRIPTION OF THE PREFERRED EMBODIMENT

Referring now to the FIGURES where like numerals indicate like parts. The rock and gravel cleaner 10 of the present invention includes a tank 14, a water heater 16, and a motor 18 with an internal regulator 20. The motor shaft 22 receives an idler pulley arrangement. A fan belt 26 transports the energy from the motor 18 to the reel 28 and thus permit the cylinder 12 to revolve on the frame 30.

As can be seen, the cylinder 12 is, just that, a substantially hollow compartment 32, with additional parts attached thereto. The shell door 36 of the cylinder 12 can hingingly open and close and can also be kept closed by the use of locking means 38. Additionally, ribs 40 are imposed with the cylinder 12 for added strength and definition.

Beneath the cylinder 12 is a spiral screen 42. The cylinder 12 includes a first end 44 and a second end 46. The first end 44 and the second end 46, function as end caps 48, 50, respectively, for the spiral screen 42 and aid in holding the spiral screen 42 in place.

The tank 14 contains a partition 52 that separates the tank 14 into two parts. The first part for oil 54 and the second part for oil and water 56.

The water heater 16 includes an input pipe 58 and an output pipe 60. The output pipe 60 includes a pressure switch 62, a pump 64, filter 66, a three way valve 68, and a primary filter 70. The primary filter 70 is disposed internally to the tank part 56 where the outpipe 60 enters the tank 14. The oil removal pump 61 instead of being located in the same line 58 as the water heater 16, is located on a separate line 84 of the oil tank pipe 54.

In operation, the rock and gravel cleaner 10 of the present invention washes the polluted rocks and gravel 72 using a high pressure, preheated spray 74. The polluted particles 72 are thrown into the cylinder 12, manually. The polluted particles 72 are sprayed 74 with hot water for 15 to 20 seconds, and then discharged from the other end 76 of the cylinder 12. The mixture of water and oil 56, which was washed off of the rocks during the primary operation goes into tank 14 for separation and recycling.

The frame 30 contains a pair of upper ball bearings 78 and a pair of lower ball bearings 80. Additionally, a substantially triangular void 82 is disposed at the end 46 of the cylinder 12. The void 82 permits the oil and water combination from the cylinder 12 to the tank 14 where the water and oil are continuously separated.

The rock and gravel cleaner 10 of the present invention saves time, labor and money. It cleans deeply and recycles the chemicals used.

It will be understood that each of the elements described above, or two or more together, may also find a useful application in other types of constructions differing from the type described above.

While the invention has been illustrated and described as embodied in a rock and gravel cleaner, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A rock and gravel cleaner, comprising:
    a) a rectilinear tank having a frame, said tank containing a partition that separates said tank into a first part for oil and a second part for oil and water but no part for stones, gravel, and solids;
    b) a water heater externally connected to said rectilinear tank, said water heater includes an input pipe and an output pipe, said output pipe includes an oil removal pump, a pressure switch, a pump, a filter, a three way valve, and a primary filter, so that an oil removal pump instead of being located in said output pipe with said water heater being located on its own pipe from the oil tank part;
    c) a motor containing an idler pulley arrangement and a fan belt;
    d) a revolving cylinder having open ends and having a reel at each end revolves via the energy transported from said motor to said reel by said fan belt so that said cylinder revolves on said frame; and
    e) a substantially full length spiral screen disposed beneath said cylinder, said cylinder having a pair of end caps for aiding in the holding of the spiral screen in place.

2. A cleaner as defined in claim 1; further comprising a shell door contained in said cylinder.

3. A cleaner as defined in claim 2; further comprising ribs imposed with said cylinder for added strength and definition.

4. A cleaner as defined in claim 1, wherein said primary filter is disposed internally to said tank where said outpipe enters said tank.

* * * * *